United States Patent
Garney

(10) Patent No.: US 7,130,962 B2
(45) Date of Patent: Oct. 31, 2006

(54) WRITING CACHE LINES ON A DISK DRIVE

(75) Inventor: John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 10/739,263

(22) Filed: Dec. 18, 2003

(65) Prior Publication Data

US 2005/0138283 A1    Jun. 23, 2005

(51) Int. Cl.
*G06F 12/16*    (2006.01)

(52) U.S. Cl. .................................... 711/113; 711/141

(58) Field of Classification Search ............. 711/112, 711/113, 118, 161, 141; 714/5, 14, 22, 24; 709/328
See application file for complete search history.

(56) References Cited

U.S. PATENT DOCUMENTS

| | | | | |
|---|---|---|---|---|
| 4,593,354 A | * | 6/1986 | Ushiro | 714/48 |
| 5,193,176 A | * | 3/1993 | Brandin | 714/14 |
| 5,195,100 A | * | 3/1993 | Katz et al. | 714/22 |
| 5,341,493 A | * | 8/1994 | Yanai et al. | 711/161 |
| 5,371,855 A | * | 12/1994 | Idleman et al. | 711/113 |
| 5,448,719 A | * | 9/1995 | Schultz et al. | 714/5 |
| 5,761,406 A | * | 6/1998 | Kobayashi et al. | 714/24 |
| 2003/0061444 A1 | * | 3/2003 | Herbst et al. | 711/118 |
| 2003/0088713 A1 | * | 5/2003 | Mandal et al. | 709/328 |
| 2003/0145165 A1 | * | 7/2003 | Herbst et al. | 711/112 |

* cited by examiner

*Primary Examiner*—Matthew Kim
*Assistant Examiner*—Paul Schlie
(74) *Attorney, Agent, or Firm*—Trop, Pruner & Hu, P.C.

(57) ABSTRACT

Processor-based systems which may include non-volatile write-back cache and a disk drive may flush cache when the processor-based system is shut down. Flushing large cache to a disk drive may consume large amounts of time. Sequentially writing dirty cache lines during a system shutdown may alleviate the need to flush dirty cache lines and may require much less time.

16 Claims, 3 Drawing Sheets

WRITING CACHE LINES ON A DISK DRIVE

BACKGROUND

Peripheral devices such as disk drives used in processor-based systems may be slower than other circuitry in those systems. There have been many attempts to increase the performance of disk drives. However, because disk drives are electromechanical, there may be a finite limit beyond which performance cannot be increased. One way to reduce the information bottleneck at the peripheral device, such as a disk drive, is to use a cache. A cache is a memory device that logically resides between a device, such as a disk drive, and the remainder of the processor-based system. A cache is a memory device that serves as a temporary storage area for the device, such as the disk drive. Frequently accessed data resides in the cache after initial access. Subsequent accesses to the same data may be made to the cache instead of to the disk drive.

Generally, two types of disk cache are used, write-through cache and write-back cache. Write-through disk cache means that the information is written both to the cache and to the corresponding disk drive. Write-back disk cache means that information is only written to the cache, and the corresponding disk drive is subsequently updated when the corresponding cache line is flushed. Write-back cache is faster than write-through cache but may cause coherency problems since the data in the cache may be different than in the corresponding disk drive until the corresponding cache line is flushed. A cache line of data is dirty if the data in the cache line has been updated by the system but the corresponding disk drive has not been updated. A clean cache line is a line of data in a cache that has been flushed (updated) to the corresponding disk drive.

In a system which includes non-volatile write-back disk cache, dirty cache lines may be flushed as part of a system shutdown procedure so that the cache data is coherent with the disk drive data. Coherency at shutdown protects against a cache removal or cache failure while the system is turned off. However, flushing large cache during shutdown may require extensive writing to random locations on the disk drive which may require a lot of time, perhaps minutes, to execute.

Thus, a need exists for alternative ways of flushing a cache during a system shutdown.

DETAILED DESCRIPTION

Figure 1:
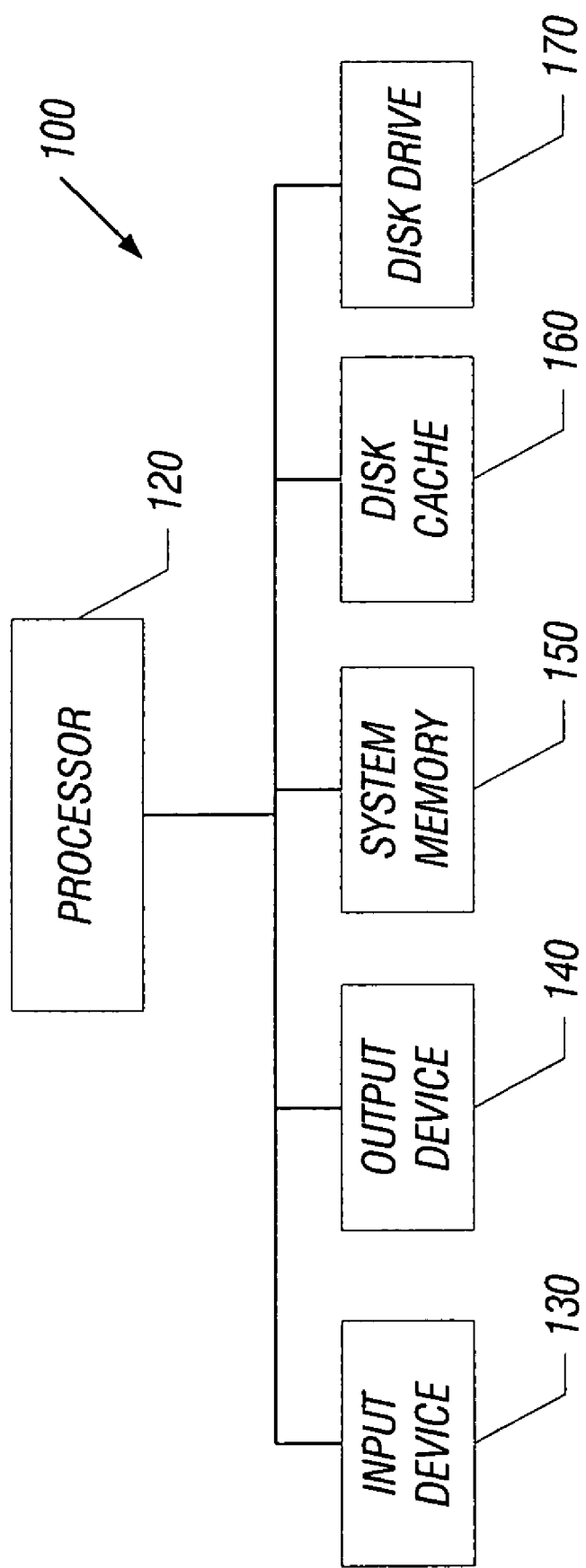
FIG. 1 is a block diagram of a processor-based system in accordance with an embodiment of the present invention.

Referring to FIG. 1, a processor-based system 100 may be a computer, a server, a telecommunication device, or any other variety of other processor-based systems. The system 100 may include an input device 130 coupled to a processor 120. The input device 130 may include a keyboard or a mouse. The system 100 may also include an output device 140 coupled to the processor 120. The output device 140 may include a display device such as a cathode ray tube monitor, liquid crystal display, or a printer. Additionally, the processor 120 may be coupled to system memory 150 which may include any number of memory devices such as a plurality of read-only memory (ROM) or random access memory (RAM). Additionally, the system 100 may include a disk cache 160 coupled to the processor 120. The disk cache 160 may include an option read-only memory which may be a medium for storing instructions and/or data. Other mediums for storing instructions may include memory system 150, disk cache 160, or disk drive 170. The processor 120 may also be coupled to disk drive 170 which may be a hard drive, a solid state disk device, a floppy drive, a compact disk drive (CD), or a digital video disk (DVD).

Disk cache 160, which may include an option read only memory, may be made from a ferroelectric polymer memory. Data may be stored in layers within the memory. The higher the number of layers, the higher the capacity of the memory. Each of the polymer layers includes polymer chains with dipole moments. Data may be stored by changing the polarization of the polymer between metal lines.

Ferroelectric polymer memories are non-volatile memories with sufficiently fast read and write speeds. For example, microsecond initial reads may be possible with write speeds comparable to those with flash memories.

In another embodiment, disk cache 160 may include dynamic random access memory or flash memory. A battery may be included with the dynamic random access memory to provide non-volatile functionality.

In the typical operation of system 100, the processor 120 may access system memory 150 to retrieve and then execute a power on self-test (POST) program and/or a basic input output system (BIOS) program. The processor 120 may use the BIOS or POST software to initialize the system 100. The processor 120 may then access the disk drive 170 to retrieve and execute operating system software. The operating system software may include device drivers which may include, for example, a cache driver.

The system 100 may also receive input from the input device 130 where it may run an application program stored in system memory 150. The system 100 may also display the system 100 activity on the output device 140. The system memory 150 may be used to hold application programs or data that is used by the processor 120. The disk cache 160 may be used to cache data for the disk drive 170, although the scope of the present invention is not so limited.

Figure 2:
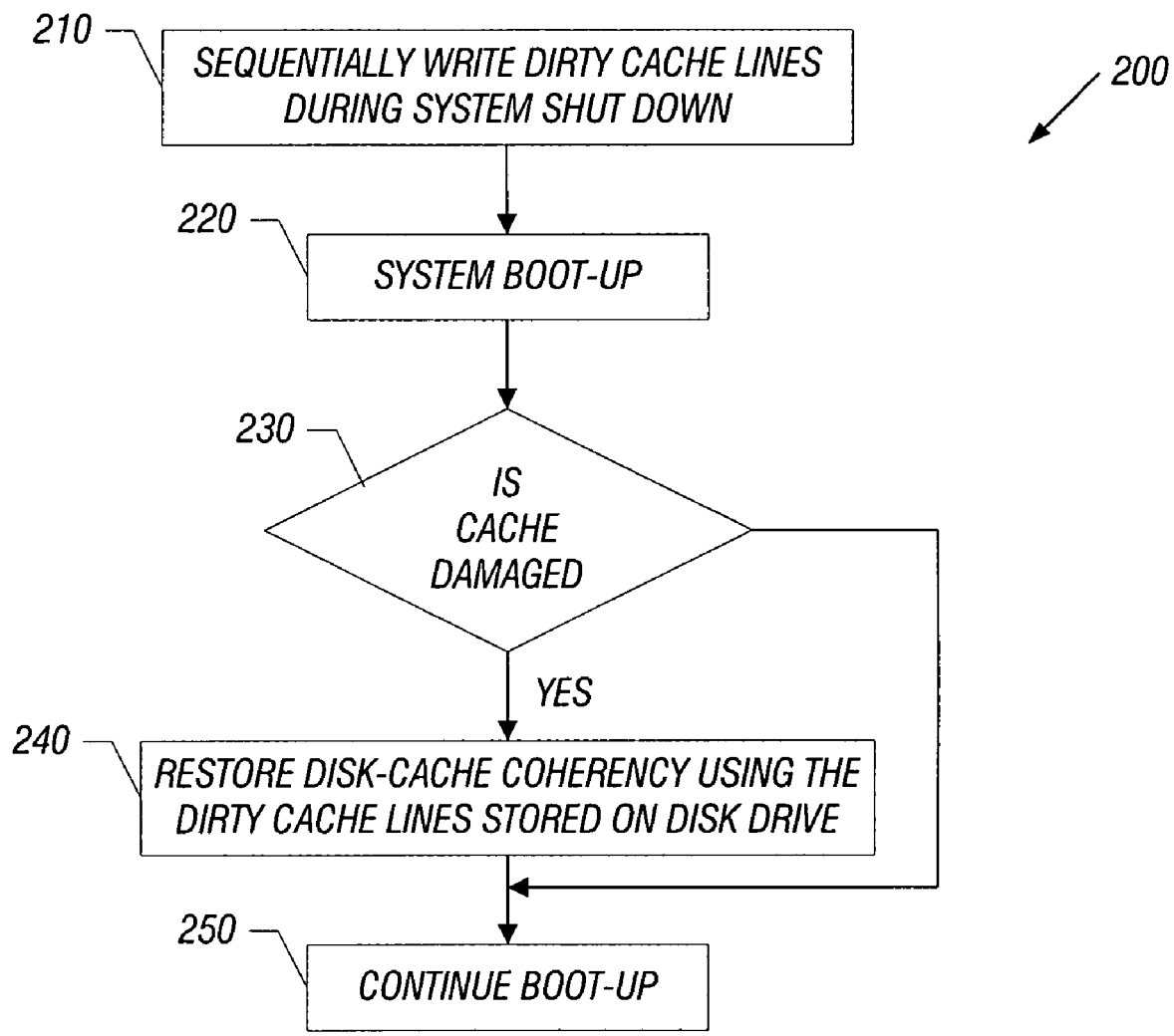
FIG. 2 is a flow chart in accordance with an embodiment of the present invention.

Referring to FIG. 2, an algorithm 200 for disk caching in a processor-based system may be implemented in hardware or by executing software stored in any one or more of the mediums for storing instructions in system 100 of FIG. 1. Mediums for storing instructions in system 100 may include system memory 150, disk cache 160, or disk drive 170, of FIG. 1.

For a processor-based system 100 of FIG. 1 which may be running, the system 100 may execute code which sequentially writes dirty cache lines during the system shutdown process, as illustrated in block 210. Such sequential writing may be to disk drive 170 associated with disk cache 160. In certain embodiments, sequentially writing dirty cache lines may be faster than flushing dirty cache lines to their normal disk locations, since flushing may require random reads on the disk drive 170. Random reads on a disk drive 170 may require the disk drive 170 heads to move from one part of the disk to a potentially distant part of the disk. The relatively large distances traveled by the disk drive 170 heads may require acceleration and de-acceleration time.

In contrast, a sequential write may allow the disk drive 170 to run in a streaming mode with a minimum number of head seeks and may therefore be faster. In one embodiment, a region of the disk drive 170 may be reserved for storing dirty cache lines from the disk cache 160.

As indicated in block 220, the system 100 may then be booted up after having the dirty cache lines sequentially written to the disk drive 170. As part of the boot-up process, instructions may be executed to determine if the disk cache 160 has been damaged, as indicated in diamond 230. Such instructions may be performed in BIOS code in certain embodiments. If the disk cache 160 has not been damaged, then the boot-up continues as indicated in block 250. Since the disk drive 170 is not coherent with the disk cache 160 on system boot-up, the system 100 may need to satisfy disk reads from the disk cache 160 and track disk writes to preserve coherency between the disk drive 170 and the disk cache 160. However, if the disk cache 160 is damaged, failed, ore removed, then disk-cache coherency may be restored using the dirty cache lines sequentially stored on the disk drive 170, as indicated in block 240. In one embodiment, in recovering utility may be used to restore a coherent version of disk drive 170. After the disk-cache coherency has been restored, then the boot-up process may continue as indicated in block 250.

In certain embodiments, algorithm 200 may reduce the amount of time required to perform a system shutdown in a system with non-volatile write-back disk cache while ensuring data coherency even if a disk cache 170 were to fail or be removed from the system while the system is shutdown.

Figure 3:
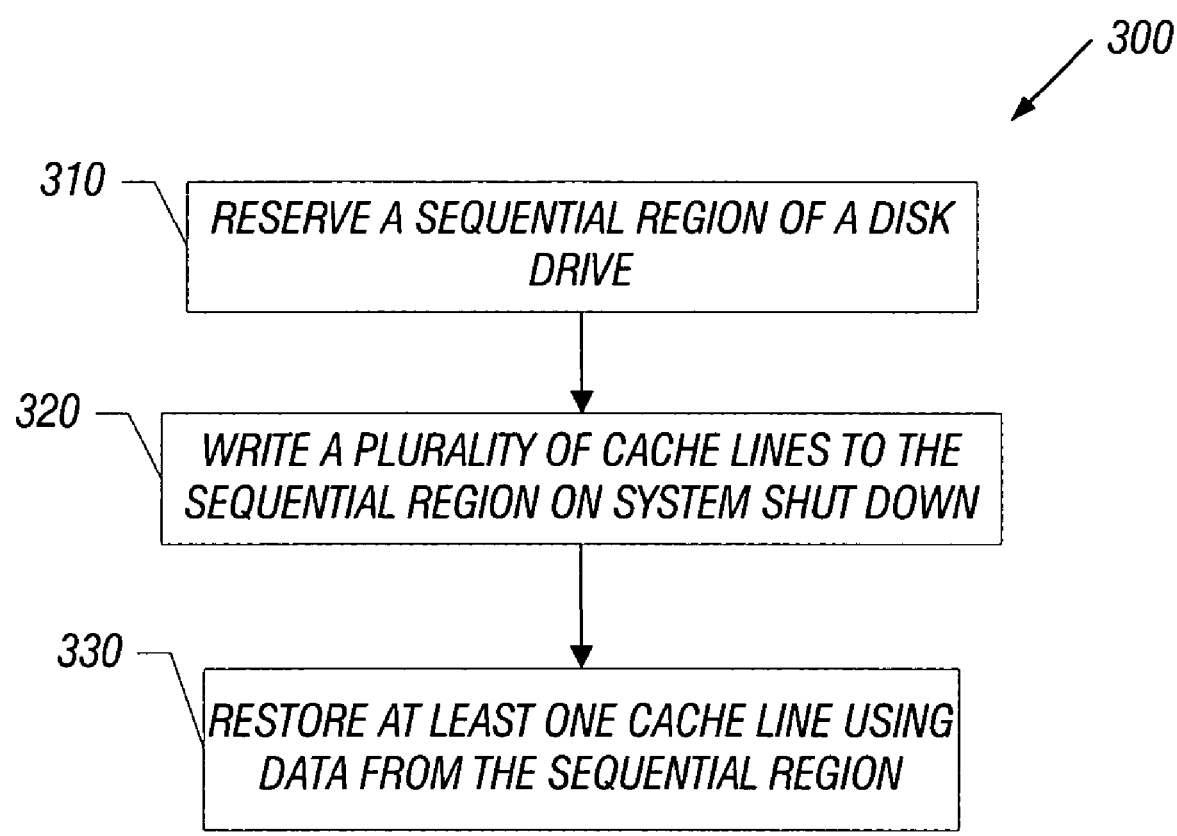
FIG. 3 is a flow chart in accordance with another embodiment of the present invention.

Referring to FIG. 3, an algorithm 300 for disk caching in a processor-based system may be implemented in hardware whereby executing software stored in any one or more of the mediums for storing instructions in system 100 of FIG. 1. Mediums for storing instructions in system 100 may include system memory 150, disk cache 160, or disk drive 170 of FIG. 1.

The system 100 of FIG. 1 may execute code which reserves a sequential region of a disk drive, as illustrated in block 310. This space may be reserved to store cache lines. During a system shutdown, a the system 100 may execute code to write a plurality of cache lines to the sequential region of the disk drive before or during a system shut down, as indicated in block 320. In one embodiment, only the dirty cache lines may be written sequentially to the disk drive. In another embodiment, all cache lines may be written sequentially to the disk drive. By saving the cache lines to the disk drive, the cache data is available to restore the cache data in the event that the disk cache 160 were to be damaged or removed, as illustrated in block 330.

While the present invention has been described with respect to a limited number of embodiments, those skilled in the art will appreciate numerous modifications and variations that they are from. It is intended that the appended claims cover all such modifications and variations as fall within the scope of the claims.

What is claimed is:

1. A method comprising:
preserving the coherency of a disk cache within a system external to a disk drive by sequentially writing dirty cache lines comprising said disk cache to a sequential region on said disk drive upon indication of a shut-down of said system; and
subsequently restoring the coherency of said disk cache by sequentially reading previously written dirty cache lines from said sequential region on said disk drive.

2. The method of claim 1 further comprising sequentially writing a plurality of disk cache lines to said disk drive during said system shutdown.

3. The method of claim 1 further comprising determining if a cache has a failure.

4. The method of claim 3 further comprising restoring disk-cache coherency using said plurality of cache lines stored on said disk drive.

5. An article comprising a medium storing instructions that, if executed, enable a processor-based system to:
preserve the coherency of a disk cache within a system external to a disk drive by sequentially writing dirty cache lines comprising said disk cache to a sequential region on said disk drive upon indication of a shut-down of said system; and
subsequently restore the coherency of said disk cache by sequentially reading previously written dirty cache lines from said sequential region on said disk drive.

6. The article of claim 5 further storing instructions that, if executed, enable a processor-based system to write a plurality of disk cache lines to said disk drive during said system shutdown.

7. The article of claim 5 further storing instructions that, if executed, enable a processor-based system to determine if a cache has been damaged.

8. The article of claim 5 further storing instructions that, if executed, enable a processor-based system to restore disk-cache coherency using said plurality of cache lines stored on said disk drive.

9. A system comprising:
a cache;
a disk drive coupled to said cache; and
at least one memory device coupled to said disk drive storing instructions, that if executed, enable the system to preserve the coherency of a disk cache within a system external to a disk drive by sequentially writing dirty cache lines comprising said disk cache to a sequential region on said disk drive upon indication of a shut-down of said system and subsequently restore the coherency of said disk cache by sequentially reading previously written dirty cache lines from said sequential region on said disk drive.

10. The system of claim 9 wherein said at least one memory device stores instructions, that if executed, enable a processor-based system to write a disk cache line to said disk drive during said system shutdown.

11. The system of claim 9 wherein said at least one memory device stores instructions, that if executed, enable the system to determine if a cache has been damaged.

12. The system of claim 9 wherein said at least one memory device stores instructions, that if executed, enable said system to restore disk-cache coherency using said cache line stored on said disk drive.

13. The system of claim 9 wherein said cache comprises a polymer memory.

14. The system of claim 9 wherein said cache comprises a ferroelectric polymer memory.

15. The system of claim 9 wherein said cache comprises a dynamic random access memory.

16. The system of claim 9 wherein said cache comprises a flash memory.

* * * * *